United States Patent [19]

Caplan et al.

[11] 3,764,924

[45] Oct. 9, 1973

[54] SYNCHRONOUS DETECTION SYSTEM

[75] Inventors: Lawrence C. Caplan, Los Angeles; Richard Stern, Encino, both of Calif.

[73] Assignee: The United States of America as represented by the Secretary of the Navy, Washington, D.C.

[22] Filed: May 8, 1972

[21] Appl. No.: 250,906

[52] U.S. Cl. .................................... 329/50, 328/134

[51] Int. Cl. ............................................. H03d 3/18

[58] Field of Search ........................ 329/50; 328/134

[56] References Cited

UNITED STATES PATENTS

| | | | |
|---|---|---|---|
| 3,482,174 | 12/1969 | James | 329/50 X |
| 3,154,749 | 10/1964 | Perkins | 329/50 X |
| 2,841,707 | 7/1958 | McCulley | 328/134 |
| 2,773,185 | 12/1956 | Fulton | 329/50 X |
| 3,482,173 | 12/1969 | Hilbert | 329/50 |

*Primary Examiner*—Alfred L. Brody
*Attorney*—R. S. Sciascia et al.

[57] ABSTRACT

A periodic signal to be detected plus associated noise components are amplified, filtered and applied as an input to a pair of chopper switches gated synchronously with the signal to switchably chop the signal into phase-locked, complementary half wave portions. In effect, each of the chopper outputs has a direct current waveform with one of the outputs being opposite in sign to the other. The chopper outputs then are applied as separate inputs to the inverting and non-inverting inputs of a differential, low-pass, narrowband filter to eliminate random noise as well as any common errors present on both of half-wave inputs. The output of the low-pass filter is a single-polarity dc voltage which being proportional to the amplitude of the signal to be detected, provides the means for detecting the signal. A reference signal is used to gate the choppers and preferably it is processed by an integrated logic circuit to provide a pair of complementary gating signals one of which is with the input signal and the other 180° out of phase. The chopper switches may be MOSFET components interconnected in a series-shunt configuration which permits very rapid switching to provide distortion-free operation over a wide range of signal frequencies (1–5MHz).

12 Claims, 12 Drawing Figures

SOLID LINES: LOW PASS FILTER.
BROKEN LINES: HIGH PASS FILTER.

TABLE I. LOW PASS FILTER SWITCHING VALUES

| SWITCH POSITION | CUTOFF FREQUENCY (WITHIN 2½%) | C2 (WITHIN 5%) | C5 (WITHIN 5%) |
|---|---|---|---|
| 1 | 37.5 Hz | 1.17 µF | 0.054 µF |
| 2 | 100 Hz | 0.44 µF | 0.020 µF |
| 3 | 250 Hz | 0.176 µF | 0.008 µF |
| 4 | 625 Hz | 0.071 µF | 3200 pF |
| 5 | 1500 Hz | 0.029 µF | 1335 pF |
| 6 | 3750 Hz | 0.012 µF | 535 pF |
| 7 | 10 kHz | 0.004 µF | 200 pF |
| 8 | 25 kHz | 1750 pF | 80.0 pF |
| 9 | 62.5 kHz | 700 pF | 32.0 pF |
| 10 | 150 kHz | 292 pF | 13.4 pF |
| 11 | 375 kHz | 117 pF | 5.35 pF |
| 12 | 5.0 MHz | Omit | Omit |

FIG. 5.

TABLE II. HIGH PASS FILTER SWITCHING VALUES.

| SWITCH POSITION | CUTOFF FREQUENCY (WITHIN 2½%) | C1 = C3 (WITHIN 5%) |
|---|---|---|
| 1 | 0 | SHORT CIRCUIT |
| 2 | 37.5 Hz | 0.267 µF |
| 3 | 100 Hz | 0.100 µF |
| 4 | 250 Hz | 0.040 µF |
| 5 | 625 Hz | 0.016 µF |
| 6 | 1500 Hz | 6680 pF |
| 7 | 3750 Hz | 2670 pF |
| 8 | 10.0 kHz | 1000 pF |
| 9 | 25.0 kHz | 400 pF |
| 10 | 62.5 kHz | 160 pF |
| 11 | 150 kHz | 66.8 pF |
| 12 | 375 kHz | 26.7 pF |

FIG. 6.

TABLE III - PHASE SHIFT SWITCHING

| SWITCH POSITION | LOWEST OPERATING FREQUENCY | HIGHEST OPERATING FREQUENCY | CAPACITOR VALUE (C') |
|---|---|---|---|
| 1 | 1 Hz | 2.2 Hz | 20 µF |
| 2 | 2.2 Hz | 6.5 Hz | 10 µF |
| 3 | 6.5 Hz | 32 Hz | 2.0 µF |
| 4 | 32 Hz | 100 Hz | 0.50 µF |
| 5 | 100 Hz | 250 Hz | 0.20 µF |
| 6 | 250 Hz | 800 Hz | 0.08 µF |
| 7 | 800 Hz | 5 kHz | 0.02 µF |
| 8 | 5 kHz | 50 kHz | 0.002 µF |
| 9 | 50 kHz | 500 kHz | 200 pF |
| 10 | 500 kHz | 5.0 MHz | 20 pF |

FIG. 7.

SYNCHRONOUS DETECTION SYSTEM

BACKGROUND OF THE INVENTION

The present invention relates to synchronous detector systems sensitive only to signals at or very near to a given frequency.

It is well known that synchronous detectors, such as lock-in amplifiers, are excellent devices for detecting the presence of a known signal buried in a heavy noise background. However, the ability of these systems to achieve high standards of performance and sensitivity apparently has involved the use of relatively expensive components which frequently place these systems beyond the reach of many prospective users. Further, although it is desirable that systems of this type have a wide-band capability adapted for use with a variety of signals of interest, most available systems do not have this capability. At least, this capability or versatility is not provided to the extent that its circuitry can be manually regulated to meet a wide variety of signal and noise situations. Instead, to achieve versatility many commercially-available instruments require external plug-in attachments. Such systems obviously are rather limited in their range of operating frequencies. Also, although other systems purport to have a wide range capability, with the possible exception of those which are quite expensive and complex, their range seems to be relatively restricted. For example, comparable instruments do not appear to have a range extending from 0-5MHz.

SUMMARY OF THE INVENTION

A principal object of the invention is to provide a relatively inexpensive lock-in amplifier system capable of measuring a periodic signal under adverse signal to noise conditions.

Another object is to provide a system which stresses simplicity by using relatively inexpensive modern integrated circuits combined in a manner that achieves performance surpassing existing standards for these systems.

Still another object is to provide in a unitary, self-contained package, a wide-band system having an operating frequency range up to about 5MHz.

A further object is to provide a system having a noise-rejection capability permitting, for example, easy selection of a signal about 80dB below white noise with approximately 1–2KHz bandwidth.

These and other objects which will become apparent are achieved principally by employing a synchronous detector followed by a narrow band filter the output of which is a dc voltage proportional to the input signal amplitude. One of the features of the present system is that a reference or control signal, customarily used in these systems, is processed to generate, preferably, a pair of complementary gating signals one of which in phase with the known input signal to be detected while the other is 180° out of phase. These signals control a mixer-detector component which has a pair of inputs each coupled to one of the complementary gating signals. Most suitably, the mixer-detector includes a pair of MOSFET chopper switches arranged in a series-shunt configuration that greatly reduces the turn-off time for the switching so as to extend the wide-band operation capability. The output of the chopper switches then is applied to a narrow band filter which, may be a differential low-pass filter capable of providing the dc voltage output representative of the input signal amplitude.

Another preferred feature of the present invention is the use of a switch-controlled, active filtering system in the signal processing channel which precedes the mixer-detector stage. This switchable, active filtering system provides a simple and inexpensive means for selecting the initial pass band for the particular frequency to be detected and, since it can be readily controlled from a front panel position, it enables the present instrument to be used without external plug-in attachments. Other significant features of the invention will become more apparent in the ensuing description.

The invention is illustrated in the accompanying drawings of which

Figure 1:
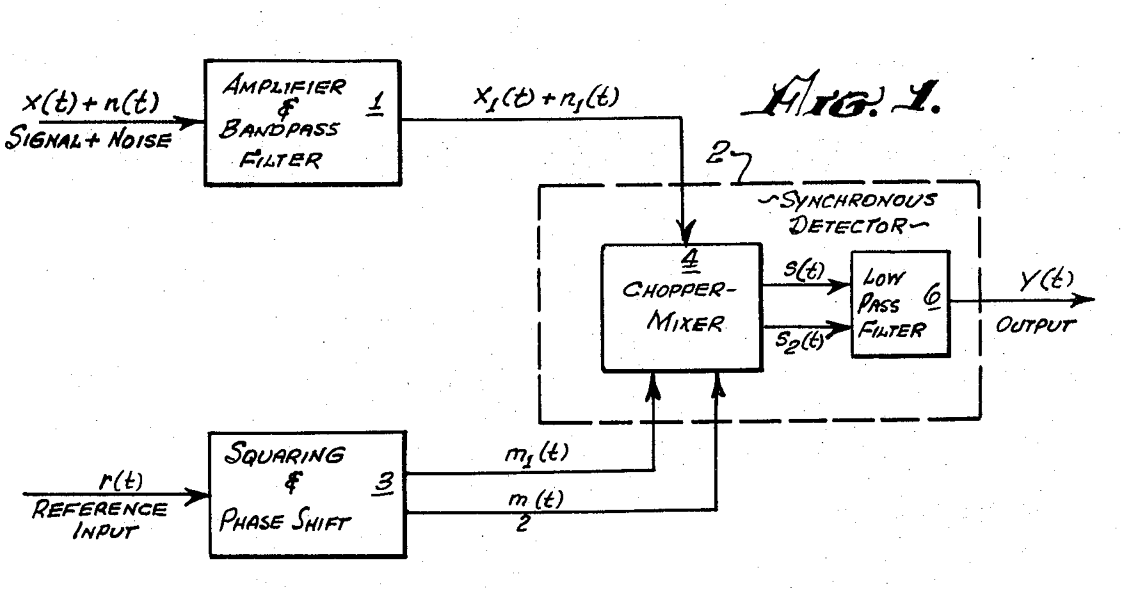
FIG. 1 is a functional block diagram of the system.
Figure 2:
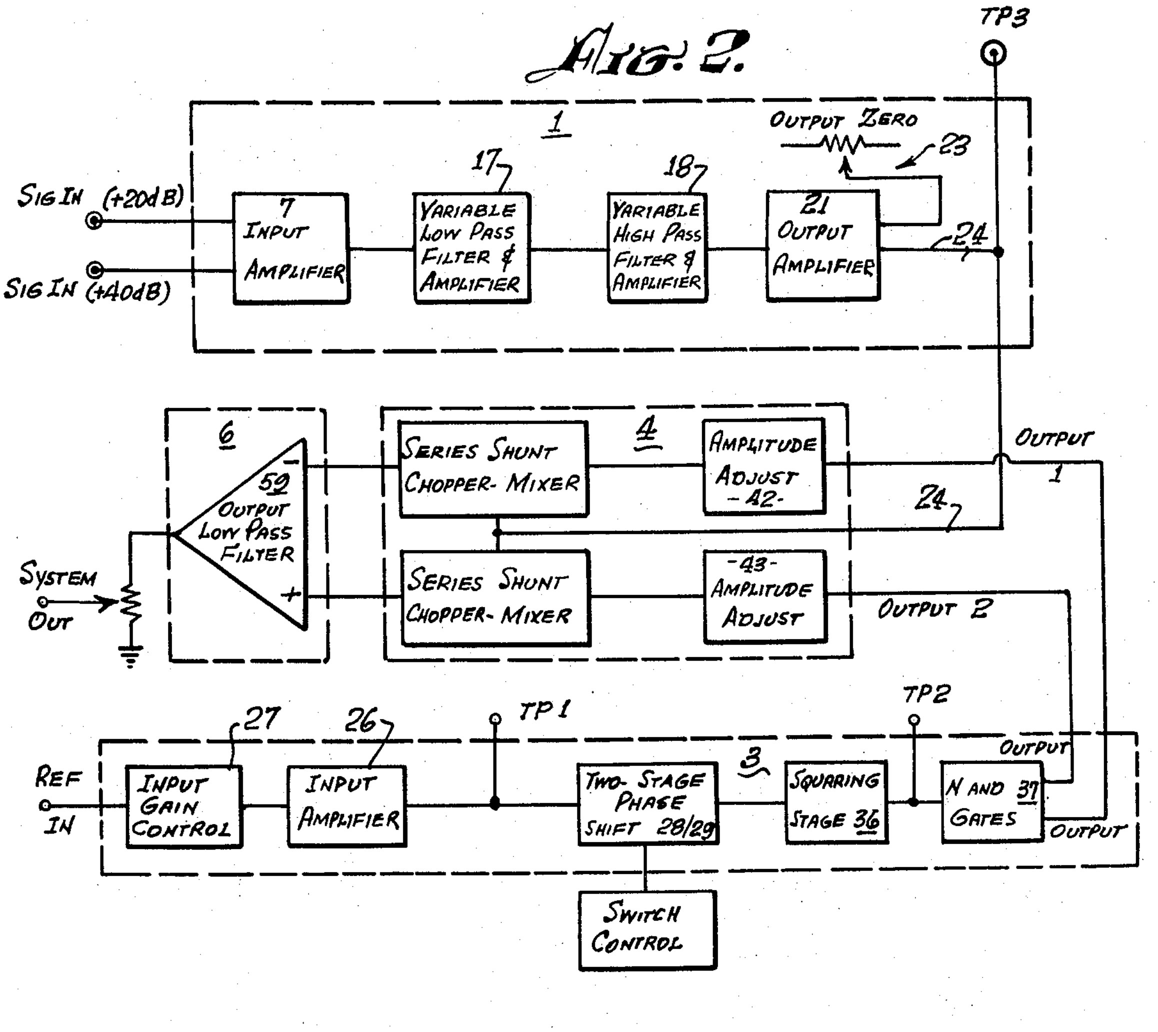
FIG. 2 is another block diagram similar to FIG. 1 but in greater detail.
Figure 3:
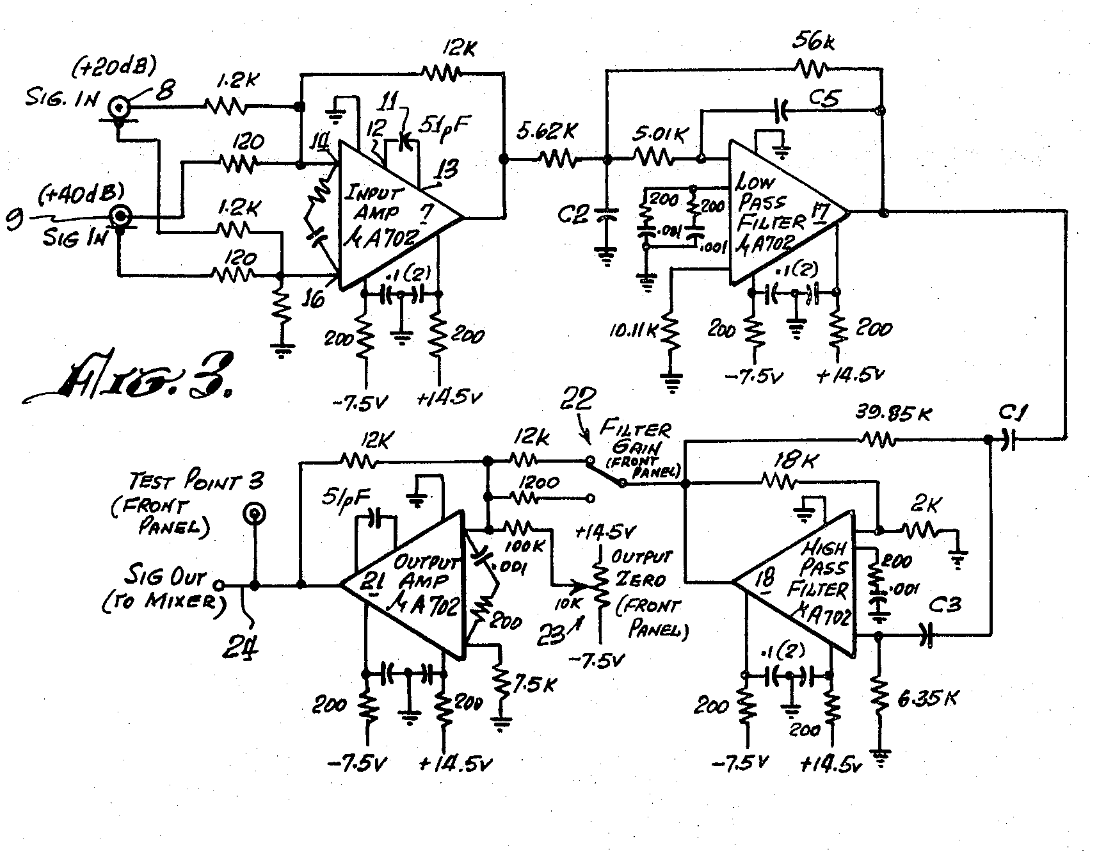
FIG. 3 is a schematic circuit showing the "Amplifier and Band Pass Filter" identified in block form in FIG. 1.
Figure 3A:
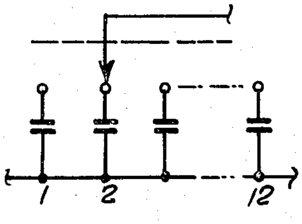
Figure 4:
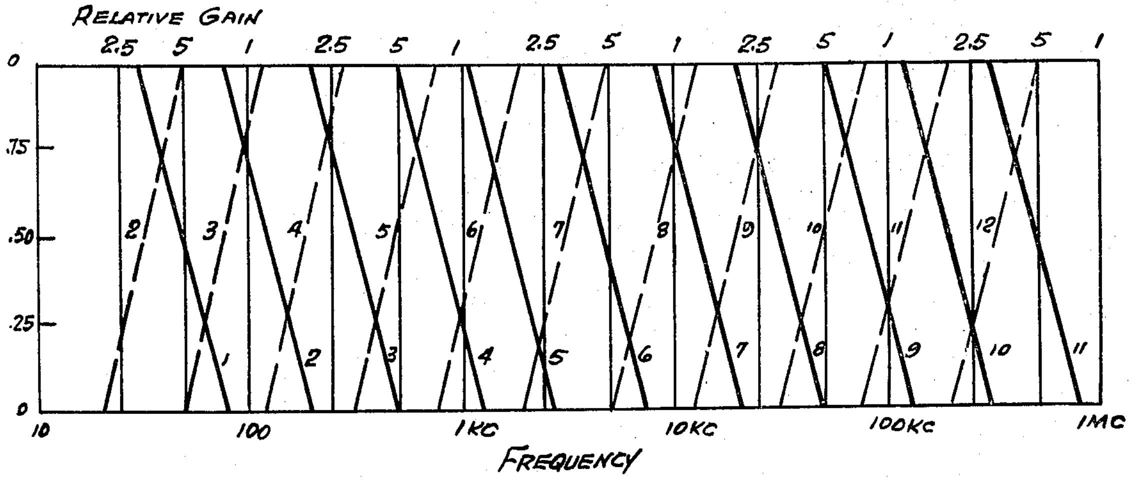
Figure 8:
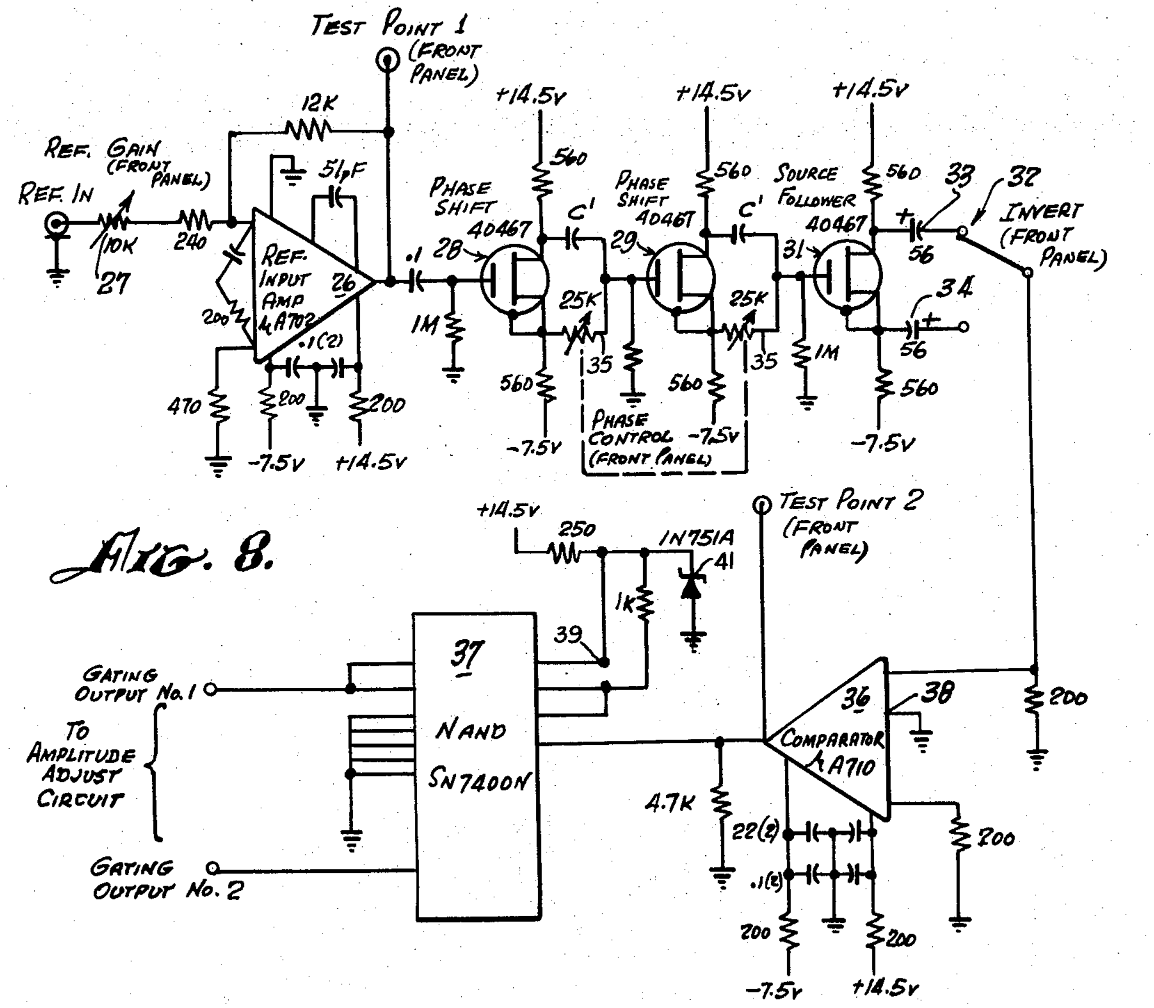
Figure 9:
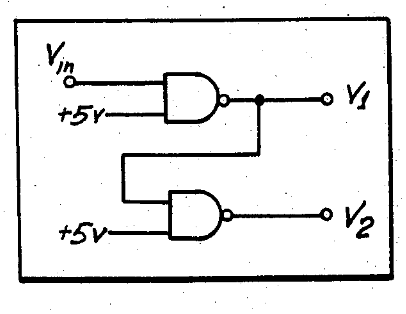
Figure 10:
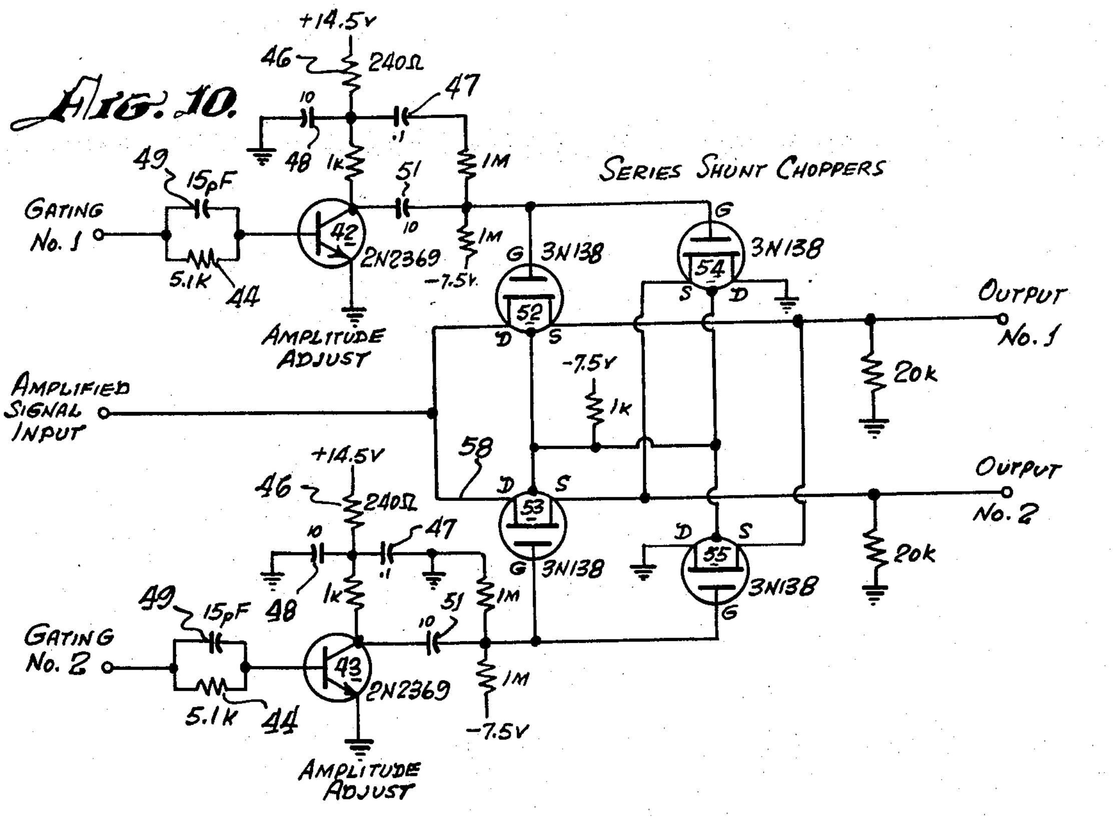

FIG. 3*a* is a schematic illustration of certain switchable capacitors that will be identified in the detailed description;

FIG. 4 is a plot illustrating the band pass characteristics of high and low pass filters schematically shown in FIG. 3;

FIGS. 5, 6 and 7 are tables providing certain capacitor switching data;

FIG. 8 is a circuit schematic for the "Squaring and Phase Shift" block shown in FIG. 1;

FIG. 9 is a logic diagram for a NAND component illustrated in FIG. 2;

FIG. 10 is a circuit schematic for the "Chopper-mixer" of FIG. 1, and

Figure 11:
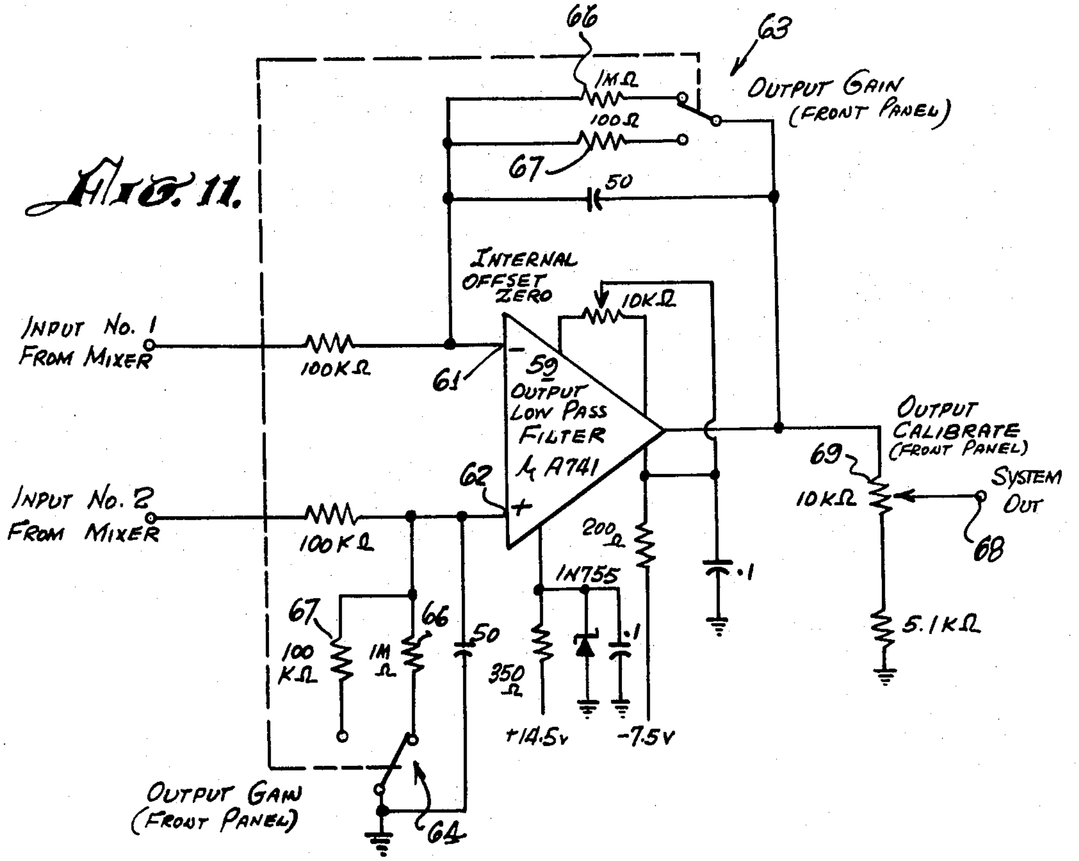

FIG. 11 is a schematic circuit diagram for the "Low Pass Filter" of FIG. 1.

DESCRIPTION OF THE PREFERRED EMBODIMENT

Referring first to FIG. 1, it is seen that the system in general has two inputs, one being a signal plus noise input, $x(t)+n(t)$, and the other being a reference signal input, $r(t)$. In systems of this type, the signal is a known signal having a known frequency. Reference signal input, $r(t)$, is derived in known manners from an oscillator or the like so as to have the same frequency as the known signal $x(t)$ that is to be detected. The signal plus noise, $x(t)+n(t)$, is amplified and filtered in block 1 of the system, following which its output, $x_1(t)+n_1(t)$, is applied to a synchronous detector 2. Similarly, reference input $r(t)$ is processed through squaring circuitry and phase shift circuitry provided in block 3 which, in turn, has a pair of outputs, $m_1(t)$ and $m_2(t)$, also applied to synchronous detector 2. The purpose of the phase shift circuitry is to synchronize the phase $m_{1,2}(t)$ with that of $x_1(t)+n_1(t)$. Thus both inputs to the synchronous detector are of the same frequency and also the same phase. As will be recognized, this phase relationship, as well as the use of a control or reference input signal are common practice for most lock-in amplifiers or synchronous detector systems.

For reasons which will become apparent, synchronous detector 2 utilizes a chopper-mixer processing technique provided in block 4 and yielding a pair of outputs, $s_1(t)$ and $s_2(t)$, applied to a differential low pass active filter contained in block 6. The output of low pass filter 6, $y(t)$, is a dc voltage that is proportional to the input signal amplitude so that detection of input signal $x(t)$ can be accomplished by monitoring this dc voltage output. The manner in which the dc voltage output, $y(t)$, is derived will, of course, be fully explained in a subsequent description. In general, however, chopper mixer 4 utilizes a pair of switching mechanisms gated or controlled by inputs $m_{1,2}(t)$, to convert the periodic and random noise input into a pair of half wave outputs which represent dc components of the signal input. When these two chopper outputs are applied to the differential inputs of filter 6, random noise, as well as errors present on both inputs, are eliminated. The output will be essentially the desired dc voltage.

FIG. 2 has been provided principally to clarify subsequent description. As will be noted, blocks 1, 3, 4 and 6 are shown in dotted lines and the principal components used in each of these blocks also are identified. However, since these same components also are shown in the schematics of FIGS. 3, 8, 10 and 11, respectively the present detailed description will be primarily with reference to these schematics. For example, the schematic of FIG. 3 includes the same components included in block 1 of FIG. 2.

Referring to FIG. 3, it will be noted that the input signal first is amplified in an input amplifier 7 which may be a Fairchild micro A702 wide band operational amplifier. This particular amplifier was selected since it proved to have the widest band width (dc to 5MHz). It also exhibits high common mode rejection greater than 60dB at all frequencies when used in the differential mode and it has excellent thermal stability. As shown, input amplifier 7 may be operated at gains of 20dB or 40dB by selecting one of the two differential input connectors 8 and 9 which, like other controls that will be described, may be provided on the front panel of the instrument. Obviously, depending upon signal strength and other factors, increased gain may be desired.

Further considering some of the details of the circuitry for input amplifier 7, it will be noted that an external lead capacitor 11 is tied across terminals 12 and 13 this capacitance having the effect of adding a leading phase shift to the open loop response. Since instability can occur at the point where the open loop gain reaches 180° of phase shift, this point has been extended. For large closed loop gains the high frequency response becomes the open loop response and stability is assured. For lower values of closed loop gain (less than 40dB) it is necessary to add lag compensation to force the high frequency response to drop below unity before the open loop 180° phase shift frequency. This additional precaution against oscillation has been taken by connecting the RC series pair across terminals 14 and 16 of the amplifier. As another precaution dictated by the wide band width of amplifier 7, the circuitry includes substantial decoupling from the power supply.

It will be noted that the circuit diagram of FIG. 3, as well as the other schematics, include the various values of the circuit elements, such as the resistance value, capacitance and so forth. In all of the schematics, resistance is given in ohms and capacitance in microfarads. Obviously, these values represent one implementation of the system and they of course can be varied to suit other situations such as the use of other amplifiers, filters and related components.

The output of amplifier 7 is applied to an active band pass filter which amplifies the input signal and noise and reduces the noise factor by passing a band width centered about the frequency of the signal of interest ($f_c$). This band pass filter provides one of the features of the present invention and, as will be seen, it is formed of two components, low pass filter 17 and a high pass filter 18. Both filters use the micro A702 operational amplifier as a two-poleactive filter, the bandpass filter as a unit actually being a low pass two-pole filter. Since a high pass filter is somewhat unstable when working into a capacitive load, it is desirable to install the low pass filter ahead of the high pass filter although normally noise rejection consideration would dictate otherwise. These active filters provide gain as well as frequency selection thereby eliminating additional amplifier stages. To accomplish the identical amplification and frequency shaping using passive filters would require two passive sections isolated by some type of active device followed by amplification.

A particular feature of filters 17 and 18 is that they both are switchably controlled simply by varying certain capacitance values, the control permitting the operator to select the desired center frequency $f_c$ as well as the Q of the filter amplifier while maintaining a relatively constant gain. Thus, referring to the circuitry for low pass filter 17, the cut off frequencies for this filter can be moved independently by means of a 12 position front panel switch (not shown), this manual switch operating to select the capacitance for capacitors $C_2$ and $C_5$ shown in FIG. 3. It is to be noted that the particular switching arrangement selected for the illustrated embodiment is a switch employing 12 discrete steps or positions. Although a variable resistance or capacitance might be employed active filters of this type have a tendency to become unstable. The use of two filters, such as low pass and high pass filters 17 and 18, is preferred over the use of a single operational amplifier in a band pass filter configuration since the switching of a single unit is complicated by the need to consider both the Q and the center frequency simultaneously. FIG. 4 is provided as a schematic showing of capacitors $C_2$ and $C_5$, as well as other discretely switchable capacitors used in the high pass filter stage and in other processing steps of the present system. FIG. 5 is provided to show the low pass filter switching values.

High pass filter section 18 also is switched in a discrete manner by varying the capacitance values of two capacitors $C_1$ and $C_3$ and FIG. 6 shows the switching values for the high pass filter. In the case of the high pass filter, the cut off frequency is independent of the gain. FIG. 4 is provided to illustrate the band pass characteristics for the 12 position switches of both the high pass and the low pass sections.

The band pass output from filter 17 and 18 is amplified in output amplifier 21 which provides the necessary signal gain and, it also will be noted, is strategically placed to provide the necessary resistive load for the high pass filter. A manual switch 22 controllable from the front panel is shown coupling the output of the band pass filter to the output amplifier, this switch permitting a selection of the output low pass filter gain. Also, a front panel control potentiometer 23 is used to allow for manual output zeroing, this capability allowing the signal channel to provide an output signal which has no dc voltage level. It has been found that this dc voltage will cause large errors when measuring low level signals. Other circuit elements shown in FIG. 3 are conventional elements the purpose of which should be readily apparent. As shown in the block diagrams of FIGS. 1 and 2, output 24 of this signal channel is applied to chopper-mixer 4 of synchronous detector 2. This output is monitored at test point 3 (FIG. 3) also provided on the front panel and it is contemplated that the monitoring of this output, as well as other circuit conditions can be accomplished by a suitable oscilloscope.

It already has been noted that synchronous detector 3 is gated by a reference signal of the same frequency as the input signal of interest and, as will be appreciated, it is essential to process this reference input in various manners particularly to assure a synchronized phase relationship with the input signal as these two signals are applied to chopper-mixer 4. Another important feature of the invention is the fact that the reference signal input is processed in a manner to be described so as to produce complementary square wave outputs one of which is in phase with the signal input to the mixer and the other 180° out of phase. These complementary outputs are employed as gating signals for the chopper-mixer which, as will be described, preferably utilizes MOSFET components.

As shown in FIG. 8, the reference signal input first is amplified in input amplifier 26 which, as will be noted, is essentially the same as input amplifier 7 of the signal processing channel. In other words, amplifier 26 has the same lead-lag capability, power supply decoupling capability and other similar circuit elements which are conventional. In addition, the gain of input amplifier 26 is controllable from the front panel by a potentiometer 27. Amplifier output control can be varied by monitoring the waveform output at Test Point 1. More specifically, the input resistance for amplifier 26 can be varied by the potentiometer continuously through a gain variation from unity to fifty. It is operationally important to monitor the output and adjust its gain until maximum undistorted output is achieved, the reason being that subsequent processing is intended to produce an accurate square wave output and the accuracy of this square wave output is improved when a maximum signal amplitude reaches the square wave generator.

The amplified reference signal input is applied to two phase shift stages connected in cascade, these two stages being provided by transistor circuits 28 and 29 and the transistors of these circuits preferably being MOSFET components such as RCA 40467-A. The term MOSFET is a conventional one which simply is an abbreviation for Metal Oxide Semiconductor Field Effect Transducers. It can be noted that the high input impedance provided by these transistors provides good isolation which permits the cascaded phase shift staging to be used without an isolation stage. Also, the transistors have sufficient band width, approximately 8MHz, in this configuration. Following the cascaded phase shift stage is a source follower 31 utilizing a MOSFET component simlar to that used in the phase shift circuitry and an inversion switch 32 operable from the front panel. This circuitry, particularly inversion switch 32, is provided to give an additional 180° of phase variation for the phase shift capability. Because of limitations in component values, the maximum phase shift for a single stage is about 170° while, of course, the necessary phase shift capability is 360°. Since the two phase phase shift thus account for a maximum phase control of 340° it is desirable to provide the additional 180° which can be accomplished by switching the inversion switch 32. Phase control also is provided at the front panel in the manner shown in FIG. 8. Phase adjustment is accomplished by gauged potentiometer 35 and by adjusting capacitor C'. The capacitors are of a type schematically shown in FIG. 3*a* and, as indicated in FIG. 7, the capacitors values can be varied by a 10-position switch (not shown), these controls being provided on the front panel.

Source follower 31 is used principally to provide the necessary complementary outputs which can be switched by inversion 32 as well as buffer the phase shift output. Bypass capacitors 33 and 34 are provided at the output of the source follower to insure that no dc level is present at a subsequent comparator input. The low frequency of the instrument is determined by the size of these capacitors and to allow the lowest possible operating frequency of one hertz these capacitors preferably are of 100 microfarads. The use of the MOSFET component for the source follower is desirable since the output of the second phase shift stage must have a large resistive load.

The output of the phase shift stages is applied to a comparator 36 which, in effect, is a square wave generator used to provide a square wave input for the subsequent logic circuitry identified in FIG. 4 as NAND block 37. Thus, the logic circuitry requires an input varies between two voltage levels.

Comparator 36 basically is an operational amplifier used in an open loop high gain mode, the voltage gain being about 2000. When pin 38, the inverting input, is tied through resistance to ground, the output can assume two levels, −.5 volts or +3 volts because of internal high speed recovery diodes. In this particular application, the operational amplifier is being used as a zero crossing detector. As long as the sinusoidal input from the source follower stage is larger than 10–20mV peak to peak, the output waveform is square with rise and fall times of less than 20 nanoseconds. It will be noted that the power supply leads for the comparator have been provided with RC decoupling circuits to prevent any positive feedback paths such as would produce oscillation.

NAND gate 37 is an integrated circuit provided in this instance by Texas Instruments SN 7400N. This particular component has a dc power requirement of +5 volts supplied to pin 39 through a conventional zener diode regulator circuit 41. This supply is necessary because the instrument supply is at +15 volts. The circuit connection used for the NAND gate provides complementary outputs identified in FIG. 8 as Gating Output No. 1 and Gating Output No. 2. Referring to FIG. 9, Gating Output No. 1 is shown as a first output, V1, which is 180° out of phase with the input while the second Output, V2, is in phase with the input. Since V2 depends on V1 there is a negligible delay time of about 5 nanoseconds. This delay is equal to 2.5 percent of the period when operating at 5MHz. The rise and fall times of the output waveforms are the fastest obtainable and are about 9 and 12 nanoseconds respectively.

It already has been stated that gating outputs 1 and 2 of the logic circuitry are used to gate mixer-chopper 4 of the synchronous detector. The circuit schematic for chopper mixer 4 is shown in FIG. 10. This schematic, however, also includes amplitude-adjust circuits 42 and 43 that directly receive gating outputs No. 1 and No. 2. Each of these adjust circuits consists of a Motorola 2N2369-A NPN switching transistor used to amplify the NAND gate output waveform and provide a NAND output voltage of either 0 or 3 volts. It is required to have a gating voltage at the chopper-mixer that changes from −6.5 to +6.5 volts. Resistors 44 provides the load resistance while resistors 46 and capacitors 47 serve as a filtering network for the power supply. Capacitors 48 act as local power supplies. When the collector voltage is changing stages, the current requirements at the collector also are changing rapidly. Capacitors 48 serve as a source or sink for these transient currents. Consequently the collector output voltage waveform is not degraded by the instrument power supply limitations.

Capacitor 49 is a compensation or 'speed-up' capacitor to match the transistor input time constant to equal its RC. At the output of the adjust circuits are decoupling capacitors 51 to level shift the output waveform. The rise and fall times at the output are 10 and 12 nanoseconds respectively.

Chopper-mixer 4 includes a arrangement of chopper switches which preferably are four field-effect transistors 52, 53, 54 and 55 interconnected in a series-shunt configuration to switch both the in-phase and the out-of-phase portions of the signal to be detected. Most suitably these transistors are 3N138 RCA MOSFETS which have extremely low input capacitance, 3pf, and feedback capacitance of 0.18pf along with inherent zero offset voltage, i.e., zero output voltage for zero input voltage. The advantage of the series-shunt connection is the greatly reduced turn-off time which extends the speed of the switching to accommodate the wide range of operating frequencies for which the instrument is adapted, i.e., DC to 5MHz. Also, this arrangement provides excellent isolation in that the series and shunt coupling operates to shunt to ground signals that otherwise might get through the series arrangement.

Considering these transistors in a more specific manner it will be noted that each has a gate electrode (G) and drain and source electrodes (D) and (S) and the series-shunt arrangements includes pairs of transistors 52–55 and 53–54. As will be noted the outputs of transistors 52 and 53 are shunted to ground through transistors 54 and 55 respectively. Gating output No. 1 of the NAND gate is applied to gating electrodes G of transistors 52 and 54 while gating output No. 2, which is a complement of output No. 1, is applied to the gating electrodes of the other two transistors. Since the NAND gate inputs to the chopper are synchronized in phase with the signal input, the transistors themselves are gated synchronously with the periodical input derived from the signal channel. This signal input, $x_1(t)+n_1(t)$, is coupled by leads 57 and 58 to the drain electrodes of transistors 52 and 53. The two gating waveforms being complementary square signals, the transistors are going between on and off, but out-of-phase one with the other. As has been pointed out, the use of a balanced MOSFET chopper of this type in a series-shunt configuration is particularly advantageous especially to accomodate the switching speed requirements imposed by the wide band capability of this instrument.

There are two types of errors normally associated with any transistor chopper switch, the first being due to the finite rise and fall times. In the present arrangement the rise time of the switching is faster than the rise time of the frequency of the signal to be detected so that operation is essentially distortion free. The other source of error is due to feed-through spikes. The tandem pairing of the present transistors greatly minimizes these spikes. Further, since the spikes alternate in polarity every half cycle of the signal waveform, their dc value is very close to zero and, after passing through "Low Pass Filter" 6 (FIG. 1), they are very close to zero.

The circuit diagram for output low pass filter 6 is shown in FIG. 11. This filter uses a Fairchild micro A 741 operational amplifier 59 in a circuit configuration that provides a differential input, low-pass narrow-band filter. Functionally considered, it is to be noted that the two inputs to low pass filter 59 are derived from the two sets of series-shunt chopper switches, each of which switches complementary half-wave portions of the detected signal. Consequently each of the complementary outputs of the chopper switches essentially is a fluctuating single-sign or dc waveform. When these complementary outputs are applied to inputs 61 and 62 of filter 59, one is inverted so that the complementary half-wave inputs are combined into a dc voltage output. Monitoring of this voltage permits the signal to be detected since, as will be shown, this output voltage is proportional to the amplitude of the input signal to be detected. Also, when the two chopper outputs are applied to the differential inputs of this filter, random noise as well as any common errors present on both inputs obviously will be eliminated.

With further regard to the circuitry of FIG. 11, it is noted that the output gain of this stage is controllable by two switches 63 and 64 which can be manually operated at the front panel to couple one of two resistors 66 and 67 into the RC circuit of which they are a part. This change in the resistance provides an additional gain of 20dB for this stage. The simultaneous changing of gain and cut-off frequency is desirable since the necessity of one implies the need for the other. The transfer function for low pass filter 6 can be mathematically derived as well as observed. Thus, it can be shown that this is a one-pole low pass filter with a cut-off frequency of 0.0032Hz or 0.032Hz depending on the switch position of switches 63 and 64.

Theoretically considered, the operation of synchronous detector 2 is best described as an ideal switch which samples $x_1(t)+n_1(t)$ whenever $m(t)$ is one (see FIG. 1). The output from mixer 4 is:

$$s(t)=[(x_1(t)+n_1(t))]m(t)$$

Rewriting $s(t)$ as a signal portion $s_s(t)$ and a noise portion $s_n(t)$:

$$s_s(t)=x_1(t)m(t)$$

$$s_n(t)=n_1(t)m(t)$$

Since $s_s(t)$ and $s_n(t)$ are the inputs to low pass filter 6, it can be noted that, if filter 6 has a bandwidth substantially less than one hertz and a gain of $A_2$, the low pass output $y(t)$ consists of a signal portion $y_s(t)$ and a noise portion $y_n(t)$ which are independent of time since all frequencies above dc have been attenuated in low pass filter 6. Because the amplitude of the noise at exactly the signal frequency $x_c$ is much less than $a_o$, the unknown input signal amplitude, $y(t)$ is very nearly equal to $y_c(t)$. Consequently, generally considered, the unknown input signal can be detected by monitoring $y(t)$ and adjusting the phase shift stages for the reference signal until $y(t)$ is a maximum. After finding the maximum of $y(t)$, it is seen that the unknown signal amplitude is:

$$a_o=(\pi/a_1a_2)y(t)\max -$$

where $a_1$ and $a_2$ respectively are the gain of the band-pass filter and the gain of low pass filter 6.

OPERATION

The instrument shown in the accompanying drawings is designed to operate with a floating twin-conductor 110V ac power source. After turning on the power, signal detection can be accomplished by performing a series of steps preferably in the sequence in which they will be described.

First, with regard to the reference input $r(t)$, Table III of FIG. 7 should be used to select the phase shift switch position that corresponds to the desired operating frequency which, of course, is dictated by the frequency of the signal to be detected. The reference signal then is coupled into the reference input connector and this signal $r(t)$ should be between 0.1 – 1.0V peak-to-peak. Test point TP No. 1 on the front panel next is monitored and reference gain knobpot 27 is adjusted until a maximum undistorted wave form results. At high impedance, low capacity oscilloscope probe may be used at TP No. 1 Using a similar probe, TP No. 2 is monitored to verify that the output of comparator 36 is a symmetric square wave at the reference frequency.

With regard to the signal input, grounding caps first are attached to both the 20dB and the 40dB inputs. If possible the required gain for the system is estimated and output amplifier 21 is set at the desired gain using front panel switch 22. If the required gain cannot be estimated it will be necessary to return to this step and repeat all subsequent steps after it has been established.

The output of amplifier 21 next is monitored at TP 3 with a probe and its voltage measured on a digital voltmeter. Using front panel zeroing knobpot 23, this voltage should be adjusted to zero to provide a signal to chopper-mixer 4 which has a zero bias. As previously stated, the presence of a direct voltage cqn produce errors when measuring low level signals: The desired band pass filter characteristics (filters 17 and 18) then are selected using Tables I and II (FIGS. 5 and 6) and capacitors $c_2c_5$ and $c_1c_3$ are switched manually to establish these characteristics. Table IV (FIG. 4) should be helpful in determining the bandpass to be selected.

At this point, the grounding cap from the input which is to be used is removed and the input signal, which is less than 10MV peak-to-peak is attached. Output amplifier 21 again is monitored at TP 3 to determine whether the input signal has been clipped. If so, the operator, using switch 22, should reset the system gain which, as already noted, was initially estimated. In this event, all the steps subsequent to the setting of this gain should be repeated until the gain is established. If the system gain already is at its lowest value and clipping nevertheless is evident, it will be necessary to attenuate the input signal.

Referring now to output low pass filter 59, its gain is selected using ganged switch 63–64 and an output connector 68 then coupled to a digital voltmeter. The input signal is removed and a known amplitude signal having the same frequency as the input signal is coupled in its place. When coupled, the known amplitude signal is measured on the voltmeter and the phase adjusted by potentiometer control until the output voltage is a maximum. The system gain G for these operating conditions then is recorded. If the input signal is greater than 10 microvolts, G is constant. Input signals between 0.5 and 10 microvolts must be calibrated during each measurement. Since constant system gain is not achievable at all frequencies, a front dial potentiometer 69 is connected across the output of low pass filter 59 and a calibration curve plotted to provide the setting for dial potentiometer 69 that establishes a specific system gain at each frequency.

Finally, the input signal to be detected is attached in place of the known signal and the output at connector 68 monitored to achieve maximum voltage output by use of the phase control. Maximum voltage indicates the desired phase-synchronization of the signal and reference frequencies. The unknown signal amplitude $a_o$ then is found by using:

$$a_o=(1/G)yo$$

SUMMARY

The synchronous detector is an instrument capable of measuring a periodic signal under adverse signal to noise conditions, i.e., RMS noise at least 20dB larger than the signal. The particular instrument which has been consistently used when the noise was at least 80dB greater than the signal (over a bandwidth of 1–2kHz). In principle, it uses a synchronous detector followed by a narrowband filter to give a dc voltage proportional to the input signal amplitude. By using MOSFET chopper transistors in the series-shunt configuration, the range of operating frequencies is extended to 5MHz. Also, the design stresses simplicity and by using inexpensive integrated circuits, its performance appears to surpass existing standards. As to expense, the described circuit may be built at a component cost which is at least a factor of 5 below comparable commercial units. It also is notable that the present instrument is a self-contained unit to the extent that it can be operator-controlled using front panel controls to accommodate the wide range of operating signals which vary in frequency, amplitude, etc. Consequently, no plug-in attachments are necessary. The final unit can be packaged in a relatively small cabinet about 11 by 6 by 5 inches although care should be taken in establishing the physical layout of the components. For example, it is preferred to construct the circuit elements in a totally enclosed brass box with internal partitions to isolate the major components. Also, to avoid degrading the high frequency performance, some components, such as the filter capacitor switches, should be placed so as to minimize the length of their connecting wires.

Obviously many modifications and variations of the present invention are possible in the light of the above teachings. It is therefore to be understood that within the scope of the appended claims the invention may be practiced otherwise than as specifically described.

We claim:

1. A synchronous detector for detecting a wide range of periodic input signals buried in a random noise background, comprising:

continuously-active input signal and noise amplifying and frequency-filtering means for processing the entire periodic input to produce a narrow-band frequency signal and noise output corresponding to said entire input, a reference signal source providing a reference signal having a frequency corresponding to that of the input to be detected, reference signal processing means adapted to generate an output signal formed into a pair of complementary square-wave gating signals one of which is in phase with said amplified and filtered input signal and 180° out of phase with the other, and mixer-detector means controlled by said generated reference signal output for converting said narrow band signal and noise output into a direct current voltage output proportional to the input signal amplitude whereby said input signal can be detected by monitoring said proportional DC output, said mixer-detector including a pair of switches each being gateably-controlled by a separate one of said complementary gating signals for converting said signal and noise narrow band output into a pair of half-wave complementary signal outputs.

2. The detector of claim 1 wherein said means for forming said complementary gating outputs includes an integrated NAND-gate circuit.

3. The detector of claim 2 wherein said reference signal processing means includes a phase-adjust circuit having an output, and means for squaring the output of said phase-adjust circuit, said squaring means providing an input for said NAND-gate circuit.

4. The detector of claim 1 wherein said mixer-detector further includes:

a differential low-pass narrow-band active filtering means having inverting and non-inverting inputs coupled one to one of said pair of half-wave signal outputs and the other to the other of said pair for producing said direct current voltage output.

5. The detector of claim 4 wherein each of said pair of switches includes a pair of chopper-mixer switching circuit elements interconnected in a series-shunt configuration for promoting rapid switching and for shunting stray signals passing the series element.

6. The detector of claim 5 wherein said switching elements are MOSFET components having gate, source and drain electrodes.

7. The detector of claim 5 wherein said means for forming said complementary gating outputs includes an integrated NAND-gate circuit.

8. The detector of claim 5 wherein said input signal and noise amplifying and filtering means includes:

a variable band-pass active filtering means having an input signal frequency operating range extending from about 1 hertz to at least 5 megahertz, and manually-operable switch means for variably controlling the bandwidth of the bandpass to produce a relatively narrow-band filter output centered at about the frequency of the input signal to be detected.

9. The detector of claim 8 wherein said band-pass filtering means includes:

an active low-pass filter, an active high-pass filter, and independently operable switch means for each of said active filters, each of said switch means being manually controllable for varying the cut-off frequency of each of the filters to produce a relatively narrow-band filter means output whereby an operator can select the band-pass center frequency and bandwidth and circuit Q while maintaining a relatively constant gain.

10. The detector of claim 8 wherein said pair of chopper-mixer switching elements are MOSFET components having gate, source and drain electrodes, said narrow-band filter output of the input signal and noise filtering means being applied to the source electrode of each of said MOSFET components, and said pair of complementary square-wave gating signals derived from said reference processing means being applied one to each of the gate electrodes of said pair of MOSFET components.

11. The detector of claim 10 wherein said input signal and noise amplifying and filtering means includes:

a single variable-gain amplifier directly receiving the input signal to be detected, and an output amplifier having an input coupled to said band-pass filtering means output, said single amplifier providing an input for said band-pass filtering means.

12. The detector of claim 11 wherein said output amplifier includes manually-controllable means for zeroing the output voltage.

* * * * *